(12) United States Patent
Edelman

(10) Patent No.: US 9,147,410 B2
(45) Date of Patent: Sep. 29, 2015

(54) READER STRUCTURE WITH CANTED PINNING

(71) Applicant: Seagate Technology LLC, Cupertino, CA (US)

(72) Inventor: Harry S. Edelman, Minneapolis, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/027,431

(22) Filed: Sep. 16, 2013

(65) Prior Publication Data

US 2015/0077882 A1   Mar. 19, 2015

(51) Int. Cl.
*G11B 5/39* (2006.01)

(52) U.S. Cl.
CPC ...... *G11B 5/3906* (2013.01); *G11B 2005/3996* (2013.01)

(58) Field of Classification Search
CPC .............. G11B 5/3932; G11B 5/3903; G11B 2005/0008; G11B 2005/3996
See application file for complete search history.

(56) References Cited

U.S. PATENT DOCUMENTS

| | | | | |
|---|---|---|---|---|
| 5,260,652 A * | 11/1993 | Collver et al. | ................. | 324/252 |
| 6,447,935 B1 * | 9/2002 | Zhang et al. | ................... | 428/810 |
| 6,469,878 B1 * | 10/2002 | Mack et al. | ............. | 360/324.12 |
| 6,943,994 B2 * | 9/2005 | Zheng et al. | ............. | 360/324.12 |
| 6,958,892 B2 * | 10/2005 | Gill | .......................... | 360/324.12 |
| 7,042,685 B2 * | 5/2006 | Covington | .................. | 360/324.1 |
| 7,180,715 B2 * | 2/2007 | Gill | .......................... | 360/324.11 |
| 7,193,823 B2 * | 3/2007 | Kim et al. | ................. | 360/324.11 |
| 7,381,480 B2 * | 6/2008 | Nakamura et al. | ......... | 428/811.5 |
| 7,411,765 B2 * | 8/2008 | Childress et al. | .......... | 360/324.1 |
| 7,453,671 B1 * | 11/2008 | Nibarger et al. | .............. | 360/316 |
| 7,875,903 B2 * | 1/2011 | Nakayama et al. | ........... | 257/108 |
| 8,130,474 B2 * | 3/2012 | Childress et al. | ........ | 360/324.12 |
| 8,164,864 B2 * | 4/2012 | Kaiser et al. | ................. | 360/324.2 |
| 8,227,023 B1 * | 7/2012 | Liu et al. | ......................... | 427/127 |
| 8,582,251 B2 * | 11/2013 | Gao et al. | ................. | 360/324.12 |
| 8,599,605 B2 * | 12/2013 | Katou | ............................ | 365/158 |
| 2008/0102316 A1 * | 5/2008 | Akimoto et al. | ........... | 428/811.2 |
| 2014/0168818 A1 * | 6/2014 | Sapozhnikov et al. | .... | 360/235.4 |

\* cited by examiner

*Primary Examiner* — Brian Miller
(74) *Attorney, Agent, or Firm* — HolzerIPLaw, PC

(57) ABSTRACT

Implementations described and claimed herein provide a synthetic antiferromagnetic (SAF) layer with canted pinning, wherein a down-track direction facing surface of the SAF layer has edges that are substantially parallel to pinning direction of the SAF layer.

18 Claims, 5 Drawing Sheets

READER STRUCTURE WITH CANTED PINNING

BACKGROUND

In a magnetic data storage and retrieval system, a magnetic read/write head typically includes a reader portion having a magnetoresistive (MR) sensor for retrieving magnetically encoded information stored on a magnetic disc. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information as necessary to recover the information encoded on the disc.

SUMMARY

Implementations described and claimed herein provide a synthetic antiferromagnetic (SAF) layer with canted pinning, wherein a down-track direction facing surface of the SAF layer has edges that are substantially parallel to pinning direction of the SAF layer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTIONS OF THE DRAWINGS

The described technology is best understood from the following Detailed Description describing various implementations read in connection with the accompanying drawings.

DETAILED DESCRIPTIONS

Figure 1:
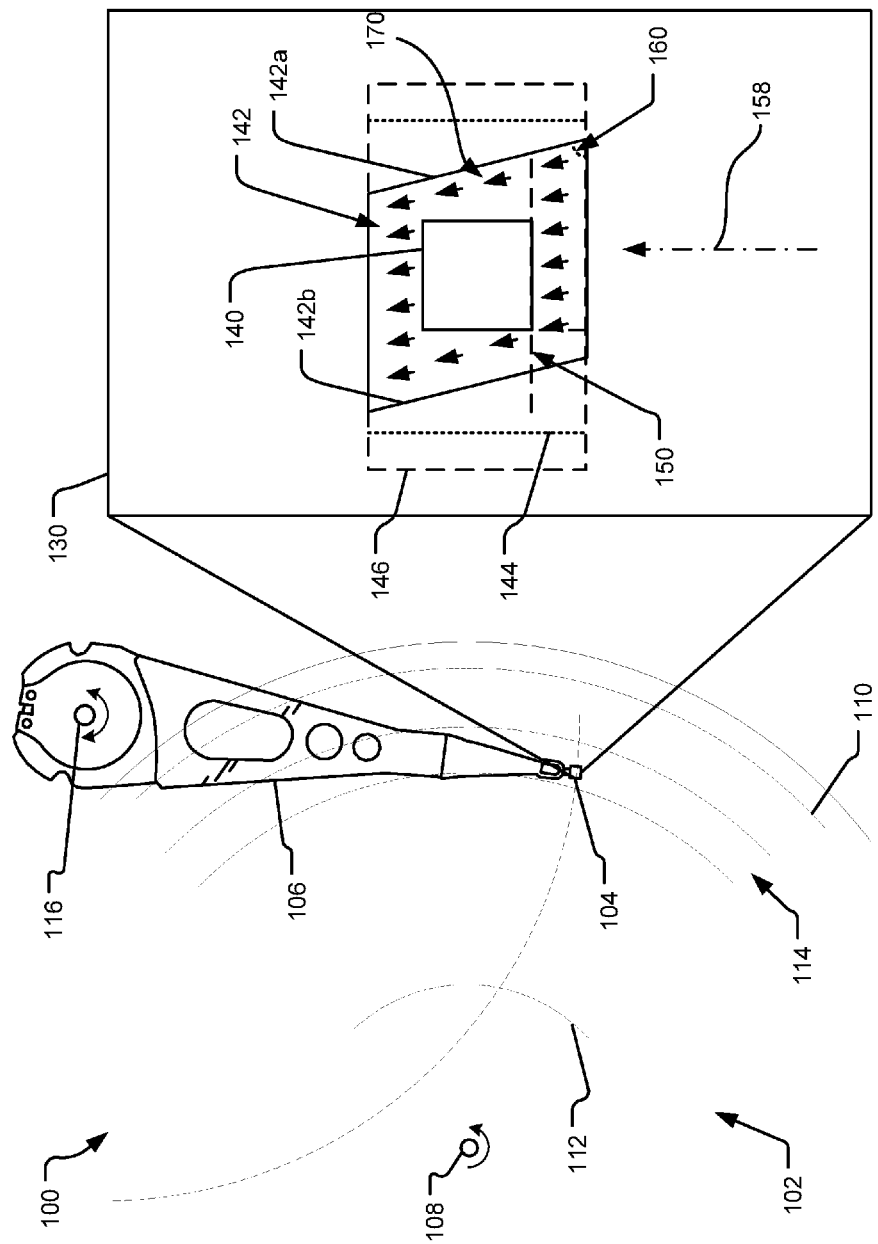
FIG. 1 illustrates a schematic plan view of an example read sensor structure implemented on an end of an actuator assembly.

In a magnetic data storage and retrieval system, a magnetic recording head typically includes a reader portion having a magnetoresistive (MR) sensor for retrieving magnetically encoded information stored on a magnetic disc. Magnetic flux from the surface of the disc causes rotation of the magnetization vector of a sensing layer or layers of the MR sensor, which in turn causes a change in electrical resistivity of the MR sensor. The sensing layers are often called "free" layers, since the magnetization vectors of the sensing layers are free to rotate in response to external magnetic flux. The change in resistivity of the MR sensor can be detected by passing a current through the MR sensor and measuring a voltage across the MR sensor. External circuitry then converts the voltage information into an appropriate format and manipulates that information as necessary to recover the information encoded on the disc.

Giant magnetoresistive (GMR) sensors are employed in read heads of magnetic data storage devices to read data recorded on a recording medium, such as a rotating disk. The data are recorded as magnetic domains in the recording medium. As the data moves past the head, the data causes changes in magnetic flux to the head. These changes in the magnetic flux in the head causes changes in the electrical impedance of the GMR sensor, which are detected by applying a bias or sense current through the sensor and detecting changes in the voltage drop across the sensor. As a result, the changing voltage across the sensor is representative of the data recorded on the recording medium.

In one implementation of MR sensor, the sensor stack includes a free layer (FL), so called because its magnetization is allowed to rotate in response to the presence of external magnetic fields, a synthetic antiferromagnetic (SAF) layer including a pinned layer (PL) and a reference layer (RL), and an antiferromagnetic (AFM) layer that is used to pin the pinning direction of the PL and RL. The pinning direction of the PL and the RL are magnetically pinned or oriented in a fixed and unchanging direction by the AFM layer.

The magnetization of AFM layers alternates with each atomic layer and averages to zero. Furthermore, AFM layers have granular structure where the magnetizations of the grains of the AFM are not strongly coupled to one another. As a result, it is possible for the grains to reverse their direction of magnetization independent of the direction of magnetization of the other grains. On the other hand, the grains of the PL and the RL layers are generally strongly coupled. In sensor structures the SAF layers, specifically the PL, are subjected to a number of external fields and such fields may cause the grains at different locations in the PL to be aligned in different directions. Nominally, the direction of magnetization of the grains in the PL opposite the direction of magnetization of the adjacent AFM surface. However, in some locations within the PL, the pinning may be pulled away from such nominal direction. As PL is located in vicinity of the top surface of the AFM, any rotation in the magnetization of PL grains exerts torque on the AFM layer near the PL.

As the RL is tightly coupled to the AFM through the PL, the deviations in pinning direction in the RL also affects the torque on grains in the AFM. If the local deviations of the RL grains get large enough, say greater than ninety degrees, the magnetization includes a component that is opposite the from the nominal or expected orientation. Such large deviation may also cause the orientation of the AFM grain adjacent to the SAF to switch, especially given that the grains of the AFM are not tightly coupled.

One of the causes for the deviations in the pinning direction of the SAF layers is the demagnetization fields (also referred to as the demag fields). For example, demag fields are caused due to the edges of the RL. The magnetization of RL grains generally tends to line up with the edge of the RL and by introducing the edges, there is local deviation in the grain orientation at locations near the edges. Thus, even if the orientation of the magnetization of the grains of the RL are in nominal direction in the middle or away from the edges, near the edges, orientation of the magnetization of the grains is deviated from the nominal orientation. As a result, the threshold for rotating the SAF pinning at the edges of the RL is smaller. Thus, it becomes easy to rotate the SAF pinning at the edges by more than 90 degrees in the presence of other external fields. Subsequently, it is easier to introduce noise in the functioning of the sensor.

To reduce these effects of the demag field on increasing the susceptibility of the sensor to noise, an implementation of a reader disclosed herein provides an SAF structure wherein an edge of the SAF structure is aligned with the nominal direction of magnetization of the SAF grains. Alternatively, an implementation of making a sensor structure disclosed herein includes matching the shape of the edges of the SAF layer with the pinning direction of SAF layer grain. Thus, in one implementation, where the SAF structure includes canted pinning of the grains, the directions of the edges of the SAF structure are also canted to be substantially aligned with the direction of canting of the SAF layer pinning FIG. 1 illustrates an example block diagram 100 illustrating an example read sensor structure implemented on an end of an actuator assembly 100. Specifically, FIG. 1 illustrates a plan view of an implementation of a disc 102 with a transducer head 104 situated on an end of an actuator assembly 106. Disc 102 rotates about a disc axis of rotation 108 during operation. Further, disc 102 includes an outer diameter 110 and inner diameter 112 between which are a number of data tracks 114, illustrated by circular dotted lines. Data tracks 114 are substantially circular and are made up of regularly spaced patterned bits.

Information may be written to and read from the patterned bits on the data tracks 114 through the use of the actuator assembly 106, which rotates during a data track 114 seek operation about an actuator axis of rotation 116 positioned adjacent the disc 102. The transducer head 104 mounted on the actuator assembly 106 at an end distal from the actuator axis of rotation 116 flies in close proximity above the surface of the disc 102 during disc operation. The transducer head 104 includes recording head including a read sensor for reading data from the track 114 and a write pole for writing data to the track 114.

To read data from the magnetic disk 102, transitions on the track 114 of the disk 102 creates magnetic fields. As the read sensor passes over the transitions, the magnetic fields of the transitions modulate the resistance of the read sensor. The change in the resistance of the read sensor is detected by passing a sense current through the read sensor and then measuring the change in voltage across the read sensor. The resulting resistance-based voltage signal is used to recover data encoded on the track of the disk 102.

FIG. 1 also illustrates an expanded view 130 of a trailing surface of a read sensor wherein the read sensor may be located on the transducer head 104. Note that one or more components of the read sensor are not to scale as illustrated in FIG. 1. The read expanded view 130 illustrates a FL 140 that is located adjacent to a SAF layer 142 along a down-track direction. Subsequently, the SAF layer 142 is arranged adjacent to an AFM layer 144, which in turn is arranged adjacent a bottom shield (BS) 146 along the down-track direction. The read sensor further includes a top shield (not shown) adjacent to the FL 140.

The edges 142a and 142b of the SAF layer 142 are canted with respect to an axis 158 orthogonal to the air-bearing surface (ABS) of the read sensor. For example, the angle 160 between the direction of an SAF edge and a cross-track direction is substantially less than ninety degrees. In the illustrated implementation, the pinning of the SAF layer 142 is also canted, as indicated by the pinning directions 170 of SAF layer grains. As a result, the direction of the edge of the SAF layer 142 is substantially parallel to the direction of pinning 170 of the SAF layer 142. Providing the edges of the SAF layer to be in the direction of the pinning of the SAF layer causes the demag field generated at the edges of the SAF layer 142 to in effect reinforce the rotation of the SAF field towards the nominal pinning direction of the SAF layer 142. Thus, the threshold for switching the SAF grain magnetization at the edges more than ninety degrees from the nominal pinning direction increases, resulting in lower noise levels for the read sensor in the presence of external fields.

Figure 2:
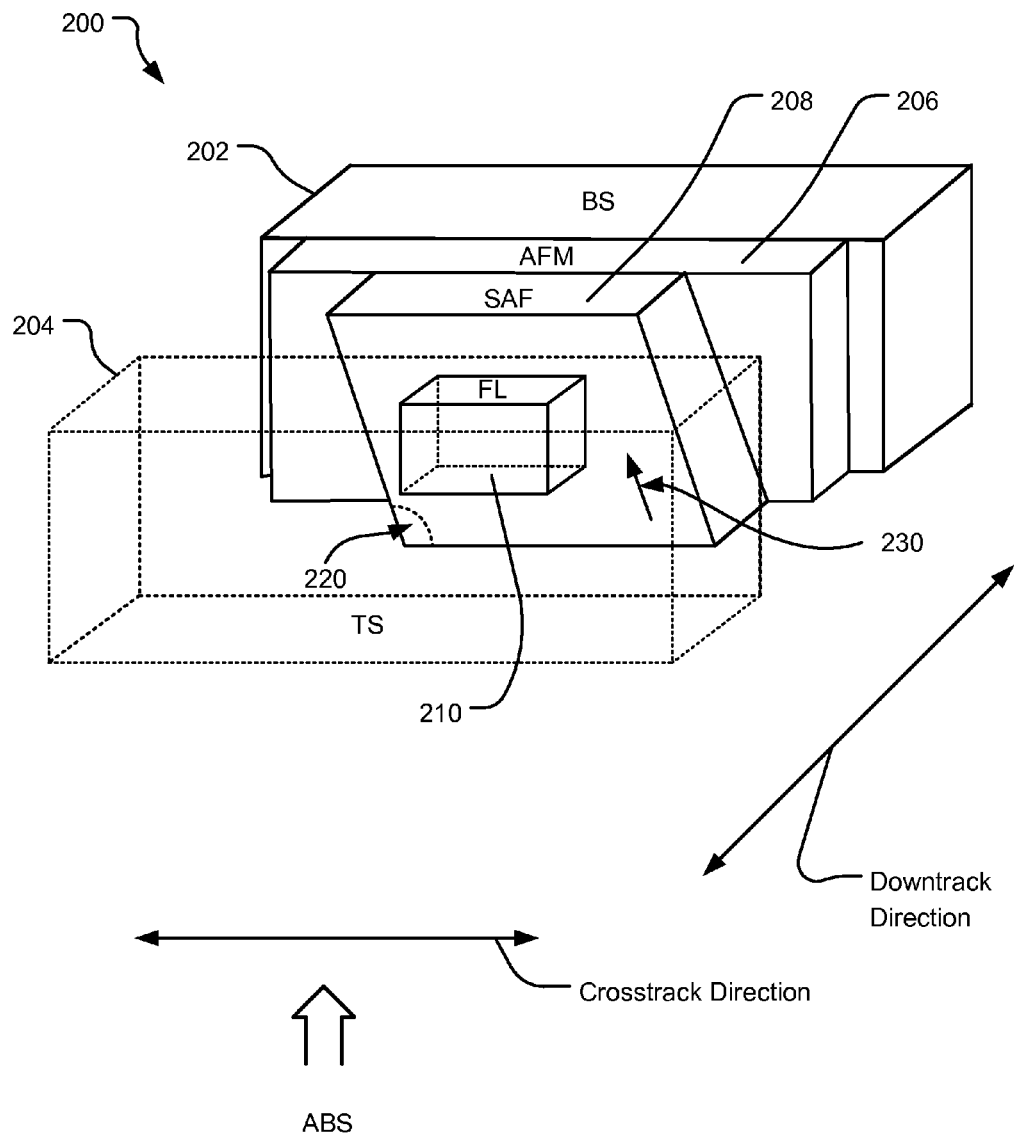
FIG. 2 illustrates a partial block diagram of an example read sensor according to an implementation disclosed herein.

FIG. 2 illustrates a partial block diagram of an example read sensor 200 according to an implementation disclosed herein. Specifically, the sensor stack 200 is arranged between a bottom shield 202 and a top shield 204 along a down-track direction. The read sensor 200 includes a sensor stack comprising an AFM layer 206, a SAF layer 208, and a FL 210 (not all layers are shown to dimension).

In the illustrated implementation, the edges of the SAF layer 208 are at an angle other than orthogonal to the ABS of the read sensor 200. For example, the angle 220 between an edge of the SAF layer 208 and a cross-track direction is substantially different than ninety degrees. Specifically, the edges of the SAF layer 208 are substantially parallel to a pinning direction 230 of the SAF layer. As a result, the demag field at the edges of the SAF layer 208 reinforces the magnetization of the grains at the edges of the SAF layer 208 along the pinning direction 230 of the SAF layer. Thus, the threshold for the external field to change the magnetization of SAF layer grains at the edges is increased, resulting in less likelihood for the grains to switch their direction of magnetization by more than ninety degrees and thus causing switching of the grains in the AFM layer 206. Such an implementation reduces the potential noise generated by the AFM grain switching and increases the stability of the read sensor.

In the implementation of the read sensor 200, the cross-sectional width of the AFM layer 206 is greater than the cross-sectional width of the SAF layer 208. Furthermore, the sides of the AFM layer 206 are not parallel to the sides of the SAF layer 208. In other words, the sides of the AFM layer 206 are orthogonal to the ABS of the read sensor 200.

Figure 3:
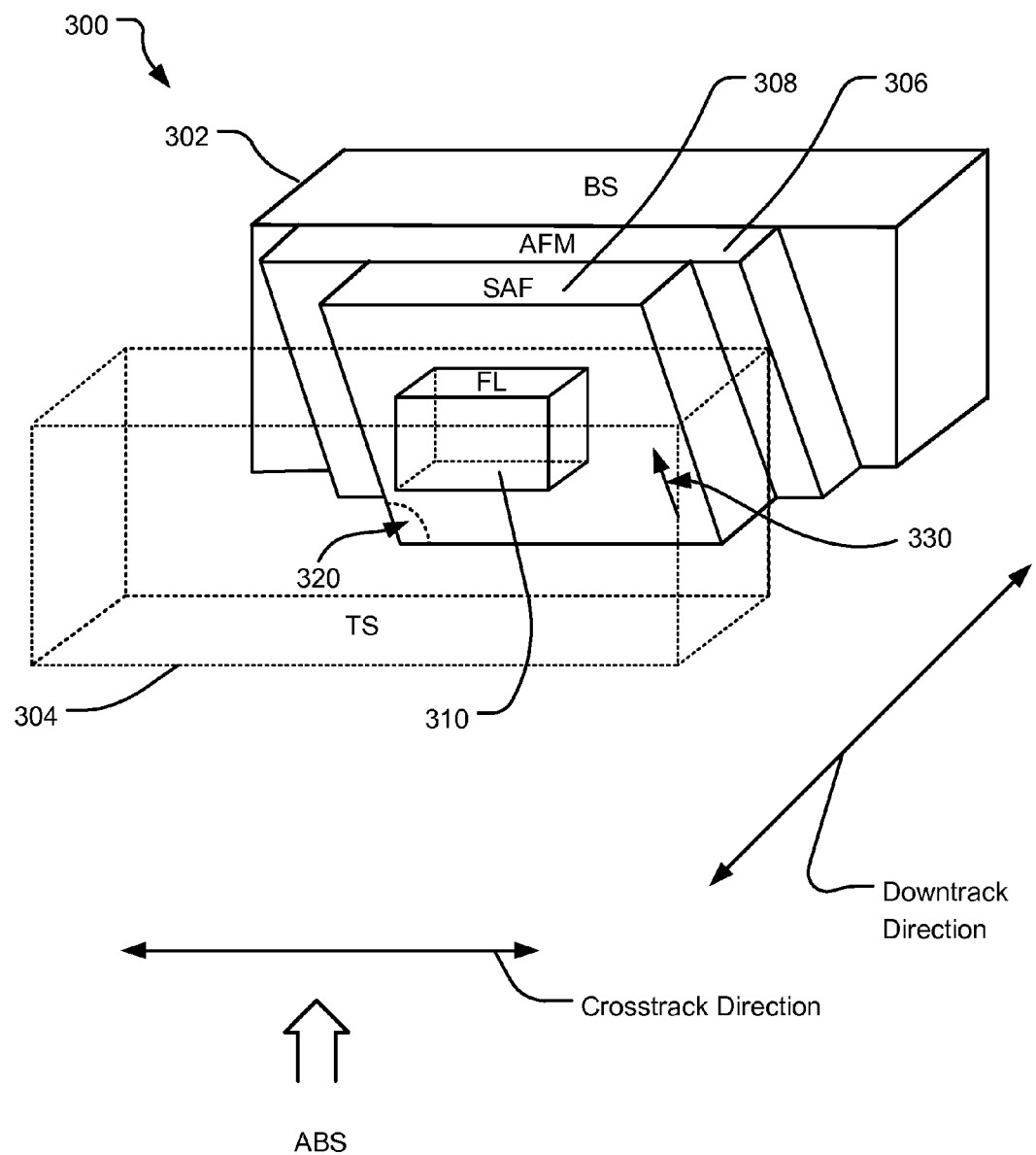
FIG. 3 illustrates a partial block diagram of an example read sensor according to an alternative implementation disclosed herein.

FIG. 3 illustrates a partial block diagram of an example read sensor 300 according to an alternative implementation disclosed herein. Specifically, the sensor stack 300 is arranged between a bottom shield 302 and a top shield 304 along a down-track direction. The read sensor 300 includes a sensor stack comprising an AFM layer 306, a SAF layer 308, and a FL 310 (not all layers are shown to dimension).

In the illustrated implementation, the edges of the SAF layer 308 are at an angle other than orthogonal to the ABS of the read sensor 300. For example, the angle 320 between an edge of the SAF layer 308 and a cross-track direction is substantially different than ninety degrees. Specifically, the edges of the SAF layer 308 are substantially parallel to a pinning direction 230 of the SAF layer. As a result, the demag field at the edges of the SAF layer 308 reinforces the magnetization of the grains at the edges of the SAF layer 308 along the pinning direction 330 of the SAF layer. Thus, the threshold for the external field to change the magnetization of SAF layer grains at the edges is increased, resulting in less likelihood for the grains to switch their direction of magnetization by more than ninety degrees and thus causing switching of the grains in the AFM layer 306. Such an implementation reduces the potential noise generated by the AFM grain switching and increases the stability of the read sensor.

In the implementation of the read sensor 300, the cross-sectional width of the AFM layer 306 is greater than the cross-sectional width of the SAF layer 308. Furthermore, the sides of the AFM layer 306 are parallel to the sides of the SAF layer 308. In other words, the sides of the AFM layer 306 are substantially at a non-orthogonal angle to the ABS of the read sensor 300.

Figure 4:
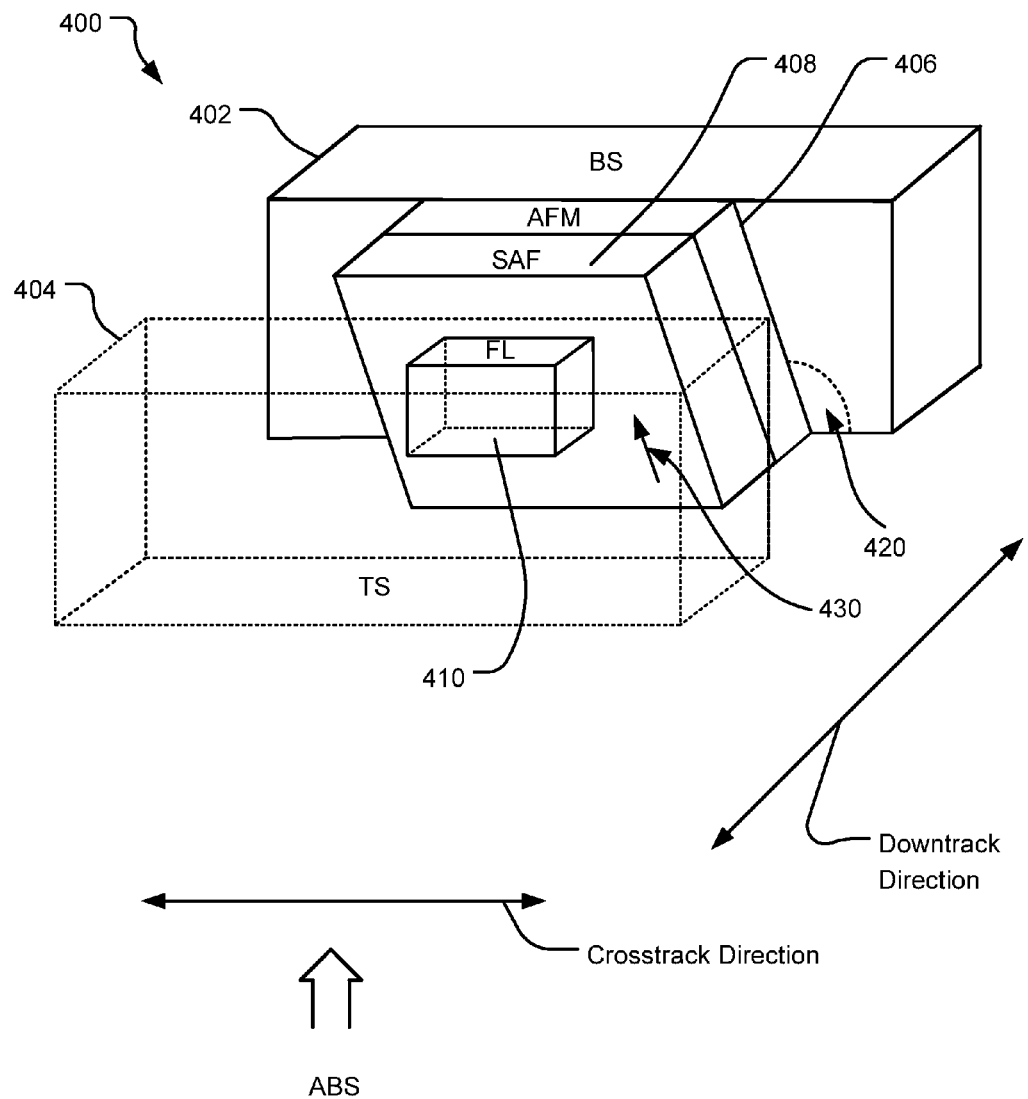
FIG. 4 illustrates a partial block diagram of an example read sensor according to an alternative implementation disclosed herein.

FIG. 4 illustrates a partial block diagram of an example read sensor 400 according to an alternative implementation disclosed herein. Specifically, the sensor stack 400 is arranged between a bottom shield 402 and a top shield 404 along a down-track direction. The read sensor 400 includes a sensor stack comprising an AFM layer 406, a SAF layer 408, and a FL 410 (not all layers are shown to dimension).

In the illustrated implementation, the edges of the SAF layer 408 are at an angle other than orthogonal to the ABS of the read sensor 400. For example, the angle 420 between an edge of the SAF layer 408 and a cross-track direction is substantially different than ninety degrees. Specifically, the edges of the SAF layer 408 are substantially parallel to a pinning direction 430 of the SAF layer. As a result, the demag field at the edges of the SAF layer 408 reinforces the magnetization of the grains at the edges of the SAF layer 408 along the pinning direction 430 of the SAF layer. Thus, the threshold for the external field to change the magnetization of SAF layer grains at the edges is increased, resulting in less likelihood for the grains to switch their direction of magnetization by more than ninety degrees and thus causing switching of the grains in the AFM layer 406. Such an implementation reduces the potential noise generated by the AFM grain switching and increases the stability of the read sensor.

In the implementation of the read sensor 400, the cross-sectional width of the AFM layer 406 is substantially similar to the cross-sectional width of the SAF layer 408. Furthermore, the sides of the AFM layer 406 are parallel to the sides of the SAF layer 408. In other words, the sides of the AFM layer 406 are substantially at a non-orthogonal angle to the ABS of the read sensor 400.

Figure 5:
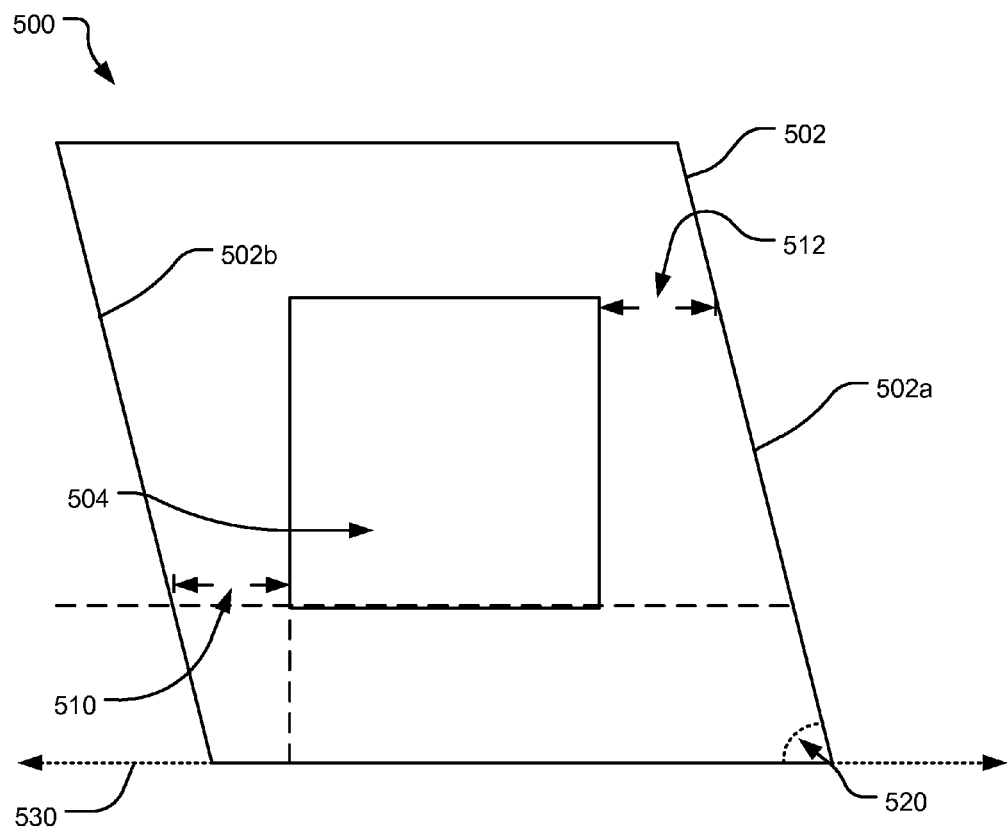
FIG. 5 illustrates an example trailing surface view of an example sensor stack according to an implementation disclosed herein.

FIG. 5 illustrates an expanded trailing surface view 500 of an example sensor stack according to an implementation disclosed herein. Specifically, the view 500 illustrates an SAF layer 502 and a free layer 504 arranged in a down-track direction. As illustrated in FIG. 5, the edges 502a and 502d of the SAF layer 502 are at a non-orthogonal angle 520 to a cross-track direction 530 of the sensor stack. Depending on the size of the FL 504, the sides 502a and 502b can be made to an angle based on tolerances 510 and 512 to ensure that any edges of the FL 504 do not protrude beyond the edges 502 and 502b of the SAF layer 502.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. An apparatus comprising:
an antiferromagnetic (AFM) layer;
a free layer (FL); and
a synthetic antiferromagnetic (SAF) layer with canted pinning stacked in a down-track direction between the AFM layer and the FL, wherein a surface of the SAF layer that faces the down-track direction has a shape with edges that are substantially parallel to a pinning direction of the SAF layer, and wherein a surface of the FL that faces the down-track direction has a shape different than the SAF layer shape.

2. The apparatus of claim 1 wherein the pinning direction of the SAF layer is substantially non-orthogonal to an air-bearing surface (ABS) of the apparatus.

3. The apparatus of claim 1 wherein a surface of the AFM layer that faces the down-track direction has a rectangular profile.

4. The apparatus of claim 1 wherein a surface of the AFM layer that faces a down-track direction has edges that are substantially parallel to the pinning direction of the SAF layer.

5. The apparatus of claim 4 wherein the edges of the surface of the SAF layer that faces the down-track direction are parallel to the sides of the down-track direction facing surface of the AFM layer.

6. The apparatus of claim 1, wherein an angle between an edge of the SAF layer and an axis orthogonal to an air-bearing surface (ABS) is sixty (60) degrees.

7. The apparatus of claim 1 wherein the AFM layer, the FL, and the SAF layer are arranged between a top shield and a bottom shield along the down-track direction.

8. The apparatus of claim 7 wherein a width of the AFM layer in a cross-track direction is larger than a width of the SAF layer in the cross-track direction, where the cross-track direction is orthogonal to the down-track direction.

9. The apparatus of claim 8 wherein the cross-track width of the AFM layer is smaller than a width of the bottom shield in the cross-track direction.

10. A sensor stack, comprising:
an antiferromagnetic (AFM) layer;
a free layer (FL); and
a synthetic antiferromagnetic (SAF) layer between the AFM layer and the FL, the AFM layer, SAF layer and FL stacked in a down-track direction, wherein a surface of the SAF layer that faces the down-track direction has a profile with at least one non-perpendicular angle, and a surface of the FL that faces the surface of the SAF layer has a profile with all perpendicular angles.

11. The sensor stack of claim 10, wherein the at least one non-perpendicular angle is substantially equal to sixty degrees.

12. The sensor stack of claim 10, wherein the SAF layer, the AFM layer, and the FL are arranged between a top shield and a bottom shield in the down-track direction.

13. The sensor stack of claim 10, wherein a width of the AFM layer in a cross-track direction is substantially greater than a width of the SAF layer in the cross-track direction, where the cross-track direction is orthogonal to the down-track direction.

14. The sensor stack of claim 10, wherein the surface of the SAF layer that faces the down-track direction has a parallelogram profile.

15. A storage device comprising:
a magnetic media; and
a reader including a synthetic antiferromagnetic (SAF) layer and a free layer (FL), the FL having a shape different than a shape of the SAF layer, wherein an edge of the SAF layer away from an air-bearing surface (ABS) of the reader is substantially parallel to a pinning direction of the SAF layer.

16. The storage device of claim 15 wherein the SAF layer is arranged between an antiferromagnetic (AFM) layer and the free layer (FL), the AFM layer, SAF layer and FL stacked in a down-track direction.

17. The storage device of claim 16 wherein a surface of the AFM layer that faces the down-track direction has an edge that is substantially parallel to the edge of the SAF layer.

18. The storage device of claim 15 wherein a surface of the SAF layer that faces the down-track direction has a profile with no perpendicular angles.

\* \* \* \* \*